US009423052B2

(12) United States Patent
Ebbes

(10) Patent No.: US 9,423,052 B2
(45) Date of Patent: Aug. 23, 2016

(54) HYDRAULIC VALVE FOR SUPPLYING SINGLE-ACTING OR DOUBLE-ACTING CONSUMER

(71) Applicant: CLAAS INDUSTRIETECHNIK GMBH, Paderborn (DE)

(72) Inventor: Bjoern Ebbes, Paderborn (DE)

(73) Assignee: CLAAS INDUSTRIETECHNIK GMBH, Paderborn (DE)

( * ) Notice: Subject to any disclaimer, the term of this patent is extended or adjusted under 35 U.S.C. 154(b) by 173 days.

(21) Appl. No.: 14/198,772

(22) Filed: Mar. 6, 2014

(65) Prior Publication Data
US 2014/0252258 A1 Sep. 11, 2014

(30) Foreign Application Priority Data
Mar. 11, 2013 (DE) .................. 10 2013 004 108

(51) Int. Cl.
*F16K 39/04* (2006.01)
*F15B 13/044* (2006.01)

(52) U.S. Cl.
CPC .......... *F16K 39/04* (2013.01); *F15B 13/0442* (2013.01); *Y10T 137/87209* (2015.04); *Y10T 137/87241* (2015.04)

(58) Field of Classification Search
CPC .............. F16K 39/04; F15B 13/0442; Y10T 137/87209; Y10T 137/87241
USPC ............. 251/282, 129.08; 137/596.16, 596.2
See application file for complete search history.

(56) References Cited

U.S. PATENT DOCUMENTS

| 3,250,293 | A | * | 5/1966 | Adams | ................. G05D 7/0635 251/129.08 |
|---|---|---|---|---|---|
| 4,077,674 | A | * | 3/1978 | Doto | ..................... B60T 15/028 251/129.08 |
| 4,605,197 | A | * | 8/1986 | Casey | ................. F15B 13/0438 251/129.08 |
| 5,836,335 | A | * | 11/1998 | Harms | ............... F15B 13/0402 137/596.2 |
| 6,186,172 | B1 | * | 2/2001 | Yoshida | ................ F15B 11/042 137/596.16 |
| 6,899,313 | B2 | * | 5/2005 | Carrillo | ............... F16K 31/0665 251/129.08 |
| 2007/0163662 | A1 | * | 7/2007 | Reilly | ................. F15B 13/0402 137/596.2 |

FOREIGN PATENT DOCUMENTS

| DE | 4423629 | 1/1996 |
|---|---|---|
| DE | 10255524 | 6/2003 |
| GB | 2486182 | 6/2012 |

OTHER PUBLICATIONS

Translation of DE10255524 Description, Blaffert et al., Jun. 2006.*
Translation of DE10255524 Claims, Blaffert et al., Jun. 2006.*
Solenoid Operated Valves Direct Acting Poppet 3-Way 2-Position, VEDT-08A-32, OD.13.01.51-Y-00, RE 18324-05, Jul. 2012, Rexroth Bosch Group.
Solenoid Operated Valves Direct Acting Poppet 2-Way Double Lock Normally Closes, VEDT-08A-A-12.7-NC, OD.11.31.18-Y-00, RE 183324-01, Jul. 2012, Rexroth Bosch Group.

* cited by examiner

*Primary Examiner* — John Bastianelli
(74) *Attorney, Agent, or Firm* — Michael J. Striker

(57) ABSTRACT

A valve formed with a valve sleeve formed with at least a first port, at least a second port and a pressure-compensated valve tappet movable between a closed position and at least one open position. The valve tappet is formed as two parts that move relative one another and are acted upon relative to one another by a hydrostatic pressure present at the first port.

12 Claims, 3 Drawing Sheets

HYDRAULIC VALVE FOR SUPPLYING SINGLE-ACTING OR DOUBLE-ACTING CONSUMER

CROSS-REFERENCE TO A RELATED APPLICATION

The invention described and claimed hereinbelow is also described in German Priority Document DE 10 2013 004108, filed on Mar. 11, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a valve for controlling the flow of a hydraulic fluid, in particular for supplying a single-acting or double-acting consumer.

Such valves having pressure-compensated and non-pressure-compensated designs are known. Non-pressure-compensated valves make it possible to utilize the pressure differential between a high-pressure connection and a low-pressure connection of the valve in order to press a closing element against a valve seat. Therefore, these are also suitable for obtaining a secure seal even in the presence of high pressure differentials. Disadvantageously, however, the hydrostatic pressure differential acting on the closing element must be overcome in order to release the closing element from the valve seat. The force required to open the valve therefore increases as the pressure differential increases, and when such a valve is supposed to be actuated by means of an actuator, the actuator must be powerful enough to overcome the greatest pressure differential that can occur at the valve. Such actuators are naturally large and expensive.

A valve having a pressure-compensated design is known, for example, as the "WEDT-08" from Bosch-Rexroth. This conventional valve has a substantially cylindrical sleeve, in the case of which a first port is formed on an end face of the sleeve and a second port is formed on the circumferential surface thereof. A valve tappet, which can move in the valve sleeve, has an axial bore, via which the pressure of the first port is present at two end faces of the tappet that face away from each other. The hydrostatic pressure forces acting on the end faces of the tappet cancel each other out, and therefore, in order to switch the valve, only a slight actuating force is required by one of the actuators acting on the end face of the tappet remote from the first port.

However, the pressure-compensated design not only prevents high pressure at the first port from holding the tappet on the seat, but also prevents high pressure at the second port from releasing the tappet from the seat. If the aim is to use the valve in a hydraulic system in which the pressure at the second port can temporarily exceed the pressure at the first port and thereby endanger components of the system, a non-return valve must be installed in parallel in order to prevent such pressure peaks, which markedly increases costs and space requirements of a valve assembly for such an application. Such pressure peaks can occur, for example, on a self-propelled harvesting machine, when an assembly that is mounted so as to be displaceable by hydraulic cylinders, such as a front harvesting attachment, is exposed to external forces during use.

SUMMARY OF THE INVENTION

The present invention overcomes the shortcomings of known arts, such as those mentioned above.

To that end, the present invention provides a simply designed valve that enables a strong flow to be controlled with a low actuating force and is simultaneously capable of counteracting excess pressures at one of the ports thereof.

For example, in the case of a valve comprising a valve sleeve having at least one first and one second port and a pressure-compensated valve tappet, which is movable between a closed position and at least one open position, the valve tappet comprises two parts configured to move relative to one another and to be acted upon relative to one another by a hydrostatic pressure present at the first port.

Provided the pressure at the first port is sufficiently greater than at the second port, the two parts of the valve tappet are held tightly together by the pressure present at the first port and can be moved jointly between the closed position and the first open position, as is the case with the tappet of the conventional valve. The fact that one part of the valve tappet can move independently of the other part makes it possible to obtain a second open position, in which the two parts of the valve tappet are separated from one another and fluid can flow from the second port to the first port.

In order to specifically achieve a transition into the second open position when high pressure is present at the second port, the two parts can advantageously touch one another in a cavity, which communicates with the second port. Therefore, fluid from the second port can easily enter the area between the two parts and drive them apart.

Advantageously, the two parts comprise end faces that face away from one another and are exposed to the hydrostatic pressure present at the first port. The pressure forces acting on the end faces in opposing directions hold the two parts in contact with one another in the closed position and in the first open position and, given that these pressure forces compensate for one another; it is ensured that the valve tappet can move easily as a whole.

The valve may be designed as a 2/2 directional control valve or a 3/2 directional control valve having a third port, which, in the closed position, is fluidically connected to the second port and, in the first open position, is disconnected from the second port. Upon transitioning between the closed position and the first open position, such a 3/2 directional control valve passes through a transition region in which either all three ports are connected to one another or all three ports are disconnected from one another. Depending on the intended use of the valve, one of these two variants can be unusable, and it is generally desired to make the transition region as short as possible. The two-part design of the valve tappet makes it possible, by a replacement or a subsequent contour change of one of the two parts of the valve tappet, to minimize the extension of the transition region or to convert a valve having negative overlap, i.e., convert a valve in which all ports are connected in the transition region into a valve having positive overlap (meaning having ports which are disconnected from one another in the transition region), and vice versa.

In the case of the 3/2 directional control valve in the first open position, the valve tappet forms a gap seal between the first port and the third port. The gap seal makes it possible for the valve tappet to move slightly away from the first open position without this necessarily immediately establishing the connection between the second and third ports.

In the case of a conventional two-part valve tappet, a connection between the two end faces extending through the valve tappet in a conventional manner would be difficult to seal off from the second port. The invention overcomes this shortcoming by providing a valve with a pressure-compensating fluidic connection between the two opposing end faces of the tappet preferably formed by a channel, which extends in the valve sleeve in a manner separated from the valve tappet.

The first part of the valve tappet is preferably a closing element, which seals at the valve seat in the closed position, and the second part is a transfer pin, which holds the closing element away from the valve seat in the first closed position. The aforementioned gap seal is then preferably formed by the transfer pin.

In the second open position, the closing element is disposed with separation from the valve seat and from the transfer pin, preferably in the same direction. The closing element and the transfer pin are separated from one another in the axial direction of the sleeve by a gap filled with hydraulic fluid.

An actuator can act on the transfer, pin in order to transfer an actuating force to the closing element.

The actuator is preferably controllable in a proportional manner in order to permit this actuator to stably assume stop positions corresponding to the first open position and the closed position, as well as positions located therebetween. As a result, for example, quantitative control of the throughput of the valve is made possible. Alternatively, the 3/2 directional control valve can be expanded into a 3/3 directional control valve in that a position of the valve tappet between the first open position and the closed position can be set, in which the three ports are either all disconnected from each other or are all connected to each other.

Since an overpressure present at the first port is incapable of acting upon the closing element in the direction of the closed position, at least one first spring element is preferably provided for this purpose.

A second spring element acts on the transfer pin in order to act upon this transfer pin in the direction of the closed position. As a result of the support by the second spring element, the force that the first spring element must apply in order to press the closing element against the valve seat is reduced. The first spring element can therefore be kept small and avoid significantly inhibiting the flow of hydraulic fluid through the valve in the opened position.

The actuator and the valve sleeve delimit a chamber, into which the pressure-compensating channel leads. The chamber is formed, in particular, in that the valve sleeve is screwed into a housing of the actuator.

In order to ensure that an overpressure at the second port acts on the closing element quickly and directly, it is advantageous for the closing element to delimit the cavity in the axial direction of the valve sleeve.

BRIEF DESCRIPTION OF THE DRAWINGS

Further features and advantages of the invention will become apparent from the description of exemplary embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
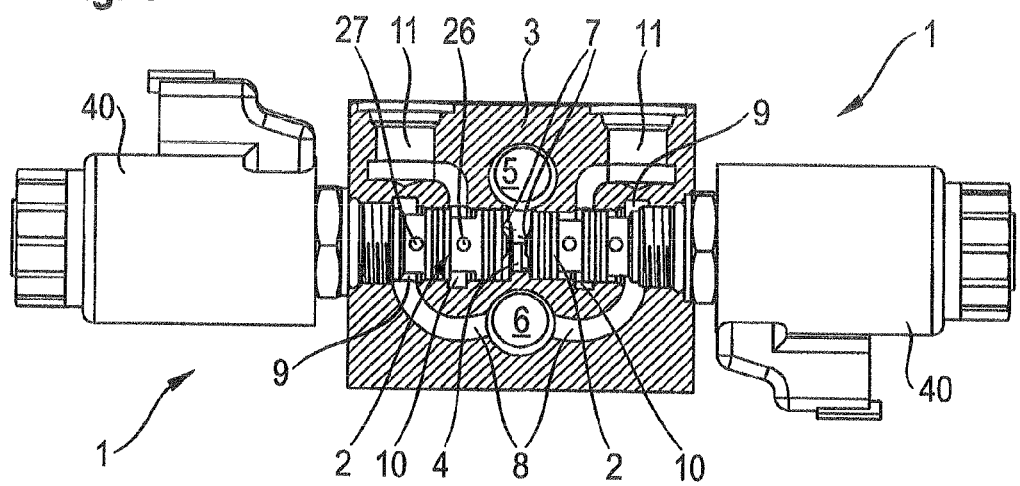
FIG. 1 depicts a section through a valve assembly comprising two 3/2 directional control valves constructed according to the invention.

FIG. 1 shows two directional control valves 1 constructed according to the invention, arranged for an exemplary application. The directional control valves 1 each comprise a valve cartridge or valve sleeve 2, which is screwed into a through-bore 4 of a valve plate 3, the through-bore extending in the plane of the drawing. The directional control valves 1 each further comprise an actuator 40 outside of the valve plate 3.

The valve plate 3 comprises two bores 5, 6 oriented perpendicularly to the plane of the drawing, wherein one bore 5 leads to the through-bore 4, between opposing end faces 7 of the valve cartridges 2, in order to direct hydraulic fluid under high pressure from a pump toward the end faces 7 of the valves. The other bore 6 is connected via branch lines 8 to annular chambers 9 extending around the valve cartridges 2, in order to direct hydraulic fluid under low pressure from there back to a tank. Further annular chambers 10 enclose the valve cartridges 2 and are each connected to consumer ports 11 of the valve plate 3. The annular chambers 9, 10 are therefore second and third ports, respectively, of the valves.

Figure 2:
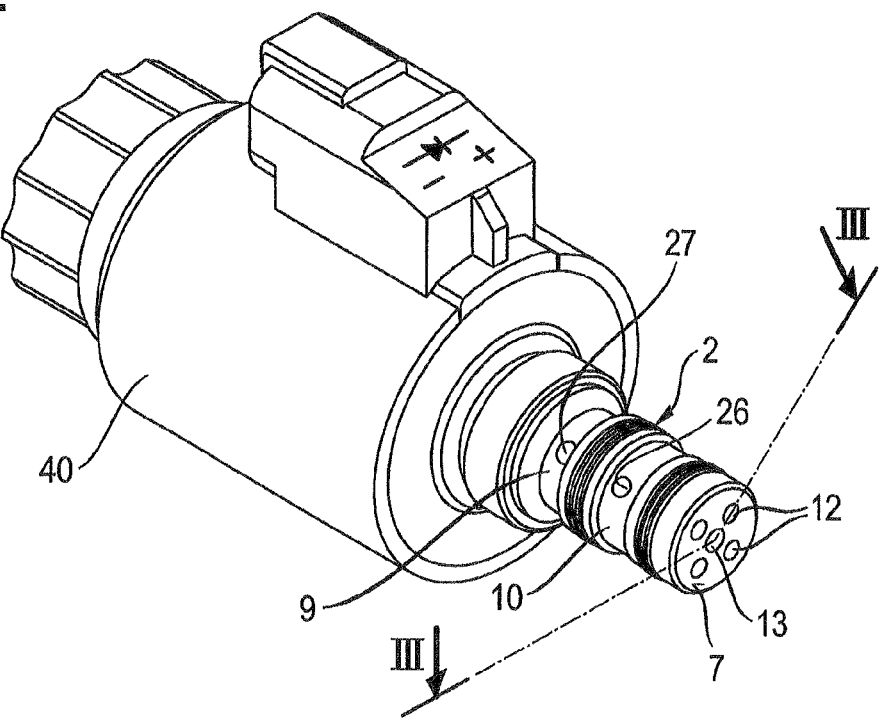
FIG. 2 presents a perspective view of one of the directional control valves from FIG. 1.

In the FIG. 2 perspective view, a central passage 13 and a plurality of passages 12 grouped around said central passage are shown on the end face 7 of the valve sleeve 2. The passages 12, 13 form a first port of the directional valve 1, which is exposed to the high pressure of the pump. As indicated in FIG. 2 by dashed lines III-III, the axial section through the directional control valve 1 shown in FIG. 3 extends through one of the passages 12 in the upper half of FIG. 3, and between two passages 12 in the lower half.

Figure 3:
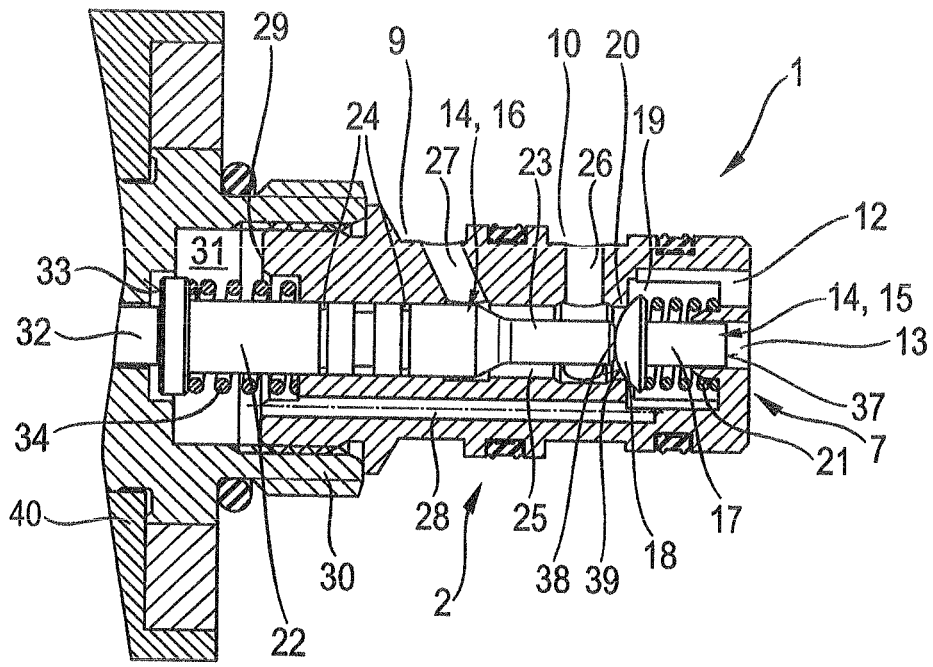
FIG. 3 depicts an axial section through the directional control valve from FIG. 2.

As shown in FIG. 3, the central passage 13 extends across the entire length of the valve sleeve 2 and contains a two-part valve tappet 14. The two parts of the valve tappet 14 are a closing element 15 and a transfer pin 16. The closing element 15 comprises a cylindrical shaft 17 and a hemispherical dish 18. The shaft 17 extends into an inlet section of the passage 13, which leads into the end face 7. The high pressure of the pump acts via the passage 13 on an end face 37 of the shaft 17. A chamber 19 having a larger diameter adjoins the inlet section, into which said chamber the passages 12 lead. A valve seat 20 is formed by a tapering of the passage 13 at the side of the chamber 19 remote from the end face 7. The spherical surface 39 of the hemispherical dish 18 is pressed, in a sealing manner, against the valve seat 20 by a coil spring 21 accommodated in the chamber 19.

The transfer pin 16 has a plunger section 22, which fills the passage 13 in a manner having a narrow tolerance, and has a tapered section 23, the tip 38 of which touches the spherical surface 39 of the hemispherical dish 18 in the center.

A cavity 25 extends annularly around the tapered section 23. Branch bores 26, which connect the cavity 25 to the annular chamber 10, form a second port of the directional control valve 1. The cavity 25 is delimited toward the end face 7 by the hemispherical dish 18. A third port is formed by branch bores 27, which lead to the side of the cavity 25 opposite the hemispherical dish 18 and connect said cavity to the annular chamber 9.

A channel 28 extends through the valve sleeve 2, from the chamber 19 to an end face 29 opposite the end face 7, parallel to the passage 13. Together with a cup-shaped housing 30 of the actuator 40, into which the valve sleeve 2 is screwed, the end face 7 delimits a second chamber 31, in which a solenoid armature 32 driven by a solenoid coil disposed outside of the housing 30 bears against an end face 33 of the transfer pin 16. The actuator 40 is designed for binary operation, i.e., the solenoid armature 32 thereof has only two reproducibly adjustable stop positions at the ends of the displacement path thereof that the actuator assumes in the energized or de-energized state, respectively, of the solenoid coil. Preferably, actuator 40 permits proportional operation, i.e., a supply circuit acts upon the solenoid roil with various non-disappearing current intensities, to which positions of the solenoid armature 32 between the stop positions reproducibly correspond.

The channel 28 ensures that the pressures in the chambers 19, 31 are the same. Therefore, in order to displace the valve tappet 14, the solenoid armature 32 substantially only needs to overcome the force of the spring 21 and a spring 34 that holds the transfer pin 16 pressed against the solenoid armature 32. An excessively high pressure can occur on the end face 7 of the directional control valve 1, for example, when a consumer supplied by the line 6 parallel to the valve 1 is exposed to an external force, and is therefore incapable of blocking the directional control valve 1.

A groove 24 is provided on the plunger section 22 in order to accommodate a sliding seal, which seals the cavity 25 with respect to the chamber 31.

As shown in Fig: 3, the chamber 19 is disconnected from the cavity 25, and therefore hydraulic fluid cannot flow from the bore 5 to the bore 6 or the consumer port 11. Since the branch bore 27 is connected to the cavity 25, hydraulic fluid from the consumer port 11 can reach the bore 6, however. When the transfer pin 16 is displaced by the solenoid armature 32 in the direction of the end face 7, this transfer pin releases the closing element 15 from the valve seat 20, thereby permitting hydraulic fluid from the bore 5 to enter the cavity 25 via the chamber 19. From the cavity 25, the fluid can continue to the annular chamber 10 and ultimately reach the consumer port 11. Alternatively, the fluid can flow, unused, to the bore 6 via the branch bores 27 and the annular chamber-9 and ultimately to the tank, provided the transfer pin 16 is not advanced far enough forward to close the branch bore 27.

Figure 4:
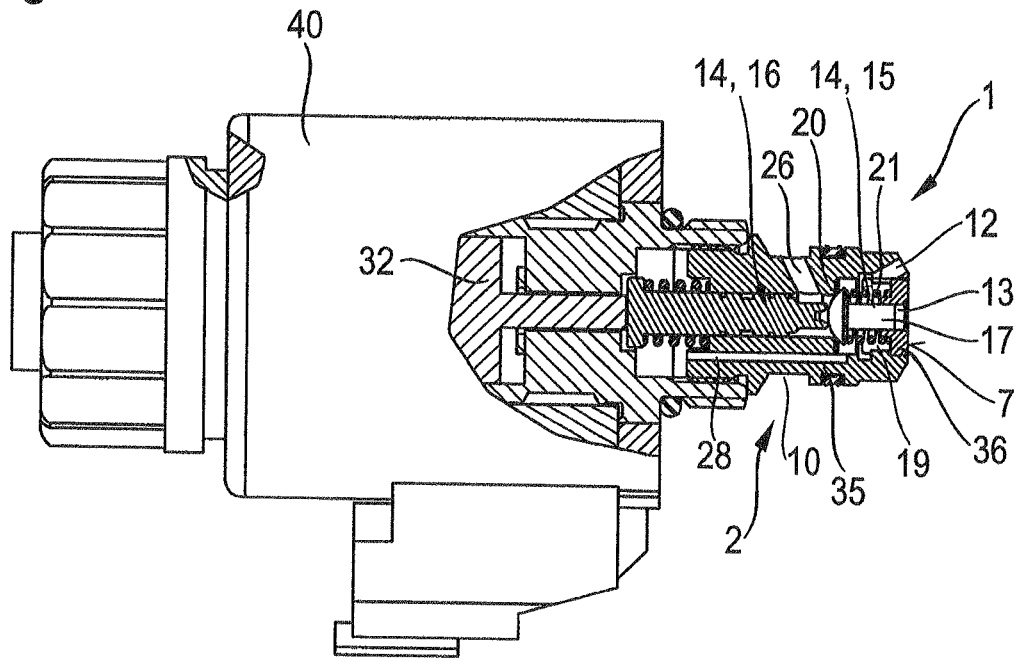
FIG. 4 depicts an axial section through a 2/2 directional control valve.

FIG. 4 shows an alternative embodiment of the directional control valve 1, as 2/2 directional control valve. As compared to FIG. 3, the branch bore 27, which can be blocked by the movement of the transfer pin 16, and the associated annular chamber 9 on the jacket surface of the valve sleeve 2 are eliminated, where the branch bore 26 and the associated annular chamber 10 remain.

A further difference between the representations in FIGS. 3 and 4 is the two-part design of the valve sleeve 2 shown in FIG. 4. This two-part design also can be implemented in the 3/2 directional control valve in FIG. 3. In greater detail, a main body 35 of the valve sleeve is bored through from the end face 7 to the valve seat 20 with a large diameter in order to form the chamber 19. A cover 36 is pressed into the bore, which supports the coil spring 21 and guides the shaft 17 of the closing element 15.

As shown in FIG. 4, the central passage 13 also extends through the cover 36. Alternatively, the cover 36 can also completely close the passage 13 and in that case comprise a blind hole that is open toward the chamber 19. Such blind hole, therefore, accommodates the shaft 17 of the closing element 15. In such design, the end face 37 of the shaft 17 is not directly exposed to the pressure present externally at the end face 7, but rather is exposed to the pressure of the chamber 19. This can simplify switching of the valve 1 in particular when the pressure is lower in the chamber 19 than at the end face 7, due to a high throughput.

Figure 5:
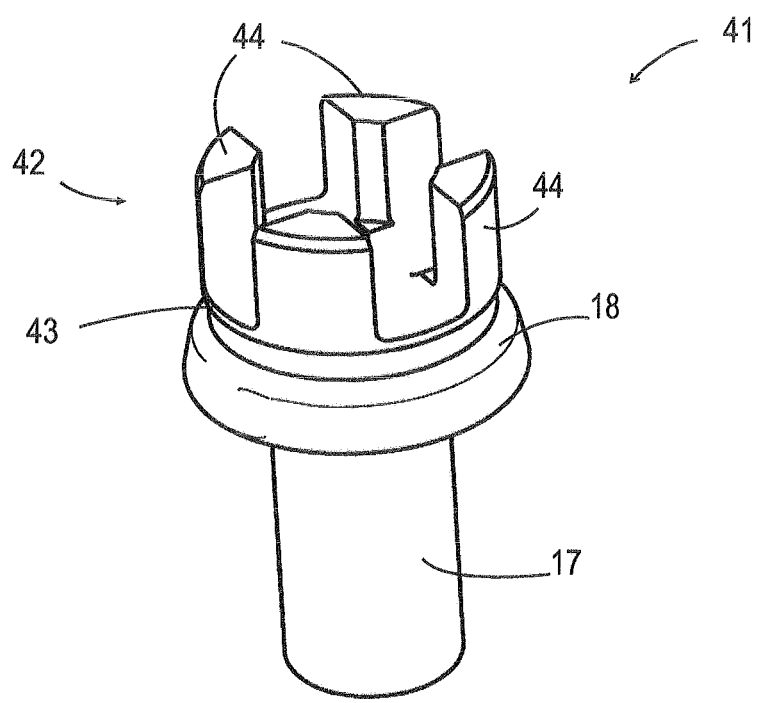
FIG. 5 depicts a closing element according to a developed embodiment of the valve.

FIG. 5 shows a perspective view of an alternative closing element 41, for use instead of the closing element 15 in the above-described directional control valves 1. Alternative closing element 41 is used to simplify proportional operation and/or to convert a 3/2 directional control valve having negative overlap into one having positive overlap.

The closing element 41 comprises (as does the closing element 15), a shaft 17, a hemispherical dish 18 and an adapter 42 placed onto the hemispherical dish 18 that engages into the cavity 25. The adapter 42 in this case has a flat cylindrical section 43, the outer diameter of which corresponds, with slight play, to the inner diameter of the cavity 25. As soon as the closing element 41 is released from the valve seat 20, the flat cylindrical section 43 forms a gap seal with the wall of the cavity 25. The gap seal delimits the throughput of hydraulic fluid from the chamber 19 to the cavity 25 in proportion to the extent of the deflection of the closing element 41. Fingers 4 projecting from the cylindrical section 43 wrap around and guide the tip of the transfer pin 16, which engages therebetween (not shown in FIG. 5).

REFERENCE CHARACTERS 1 directional control valve
2 valve sleeve
3 valve plate
4 through-bore
5 bore
6 bore
7 end face
8 branch line
9 annular chamber
10 annular chamber
11 consumer connection
12 passage/first port
13 passage/first port
14 valve tappet
15 closing element
16 transfer pin
17 shaft
18 hemispherical dish
19 chamber
20 valve seat
21 coil spring
22 plunger section
23 tapered section
24 groove
25 cavity
27 branch bore/second port
27 branch bore/third port
28 channel
29 end face
30 housing 31 chamber
32 solenoid armature
33 end face
34 spring
35 main body
36 cover
37 end face
38 tip
39 surface
40 actuator
41 closing element
42 adapter
43 cylindrical section
44 finger As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A valve, comprising:
    a valve sleeve having at least a first port and a second port;
    a pressure-compensated valve tappet that is movable between a closed position and at least one open position, the valve tappet comprising a first part and a second part; and
    a channel extending through the valve sleeve between opposing end faces of the first part and the second part;
    wherein the first part and the second part are configured to move relative to one another and to be acted upon relative to one another by a hydrostatic pressure present at the first port;
    wherein the first part is a closing element that seals at a valve seat in a closed position and the second part is a transfer pin that holds the closing element away from the valve seat in a first closed position; and
    wherein the channel is separate from the valve tappet and embodies a pressure-compensated fluidic connection between the two opposing end faces of the valve tappet.

2. The valve according to claim 1, wherein the first part and the second part of the valve tappet touch one another in a cavity in fluid communication with the second port.

3. The valve according to claim 1, wherein the first part and the second part of the valve tappet comprise end faces that face away from one another and are exposed to the hydrostatic pressure present at the first port.

4. The valve according to claim 1, wherein a third port is fluidically connected to the second port in the closed position and is disconnected from the second port in a first open position.

5. The valve according to claim 4, wherein the valve tappet forms a gap seal between the second port and the third port in the first open position.

6. The valve according to claim 1, wherein in a second open position, the closing element is separated from the valve seat and the transfer pin in the same direction.

7. The valve according to claim 1, wherein an actuator acts on the transfer pin.

8. The valve according to claim 7, wherein the actuator is proportionally controllable.

9. The valve according to claim 7, further comprising at least one first spring element that acts upon the closing element against the valve seat.

10. The valve according to claim 9, further comprising a second spring element that acts upon the transfer pin in the direction of the closed position.

11. The valve according to claim 7, wherein the actuator and the valve sleeve delimit a chamber into which the channel leads.

12. The valve according to claim 1, wherein the closing element delimits a cavity, in which the two parts touch one another and which communicates with the second port, in the axial direction of the valve sleeve.

* * * * *